United States Patent
Moroney

(10) Patent No.: US 7,164,429 B1
(45) Date of Patent: Jan. 16, 2007

(54) SIGNAL CONVERSION SYSTEM

(75) Inventor: Nathan McPherson Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 10/887,371

(22) Filed: Jul. 7, 2004

(51) Int. Cl.
G09G 5/02 (2006.01)

(52) U.S. Cl. ............................ 345/603; 345/604
(58) Field of Classification Search ........... 324/615; 345/589, 600–604, 173 FOR; 701/42; 702/109, 702/138 FOR
See application file for complete search history.

(56) References Cited

U.S. PATENT DOCUMENTS

| | | | |
|---|---|---|---|
| 5,121,231 A * | 6/1992 | Jenkins et al. | 359/7 |
| 5,497,253 A * | 3/1996 | Stoll et al. | 359/29 |
| 6,204,940 B1 * | 3/2001 | Lin et al. | 358/527 |
| 6,388,648 B1 | 5/2002 | Clifton et al. | |
| 6,466,334 B1 | 10/2002 | Komiya et al. | |
| 6,538,742 B1 | 3/2003 | Ohsawa | |
| 6,587,159 B1 | 7/2003 | Dewald | |
| 6,697,519 B1 | 2/2004 | Rao | |

OTHER PUBLICATIONS

Michael Stokes et al., "A Standard Default Color Space for the Internet—sRGB" Version 1.10, pp. 1-17, Nov. 5, 1996, <hppp://www.w3.org.Graphics/Color/sRGB/html>.

* cited by examiner

Primary Examiner—Kee M. Tung
Assistant Examiner—G. F. Cunningham

(57) ABSTRACT

A method comprising performing white component replacement on a first image signal received by a display device to generate a second image signal, applying a skew-sigmoid opto-electronic transfer function to the second image signal to generate a third image signal, converting the third image signal to a fourth image signal using a conversion matrix, and providing the fourth image signal to the spatial light modulator associated with the display device is provided.

32 Claims, 5 Drawing Sheets

SIGNAL CONVERSION SYSTEM

BACKGROUND

Display systems are typically configured to reproduce images onto a screen or other surface in response to an audio/video (AV) input signal. The AV signal includes a continuous stream of information that indicates the colors for the display system to display and the positions for each of the colors. Ideally, the color information included in the AV signal would be represented identically by different types of display systems. Unfortunately, different types of display systems may incorporate different display technologies and each type of display technology may reproduce certain colors slightly differently than other display technologies in response to the same AV signal.

Digital projectors are one type of display technology that may display certain colors slightly differently than other display technologies such as cathode ray tube (CRT) displays. The color display variations of digital projectors may result from the differences between the behavior of the optical and electronic systems that comprise a digital projector and the optical and electronic systems that comprise other types of displays. The variations may increase if the same approach to representing color used in these other types of displays is applied to digital projectors. For example, CRT display systems may apply a gain, offset, gamma (GOG) model approach to AV signals in displaying information. With digital projectors, however, the GOG model may result in significant variations in the display of colors. It would be desirable to minimize any variations in the display of colors with a digital projector.

SUMMARY

One form of the present invention provides a method comprising performing white component replacement on a first image signal received by a display device to generate a second image signal, applying a skew-sigmoid opto-electronic transfer function to the second image signal to generate a third image signal, converting the third image signal to a fourth image signal using a conversion matrix, and providing the fourth image signal to a spatial light modulator associated with the display device.

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, a conversion system is provided according to one embodiment. The system contemplates converting image data from an RGB format to an XYZ format using a white component replacement unit, an opto-electronic transfer function unit, and a conversion unit. The image data may comprise one of video image, still image, and audio/video image data. The system may also be inverted by converting image data from an XYZ format to an RGB format using the conversion unit, the opto-electronic transfer function unit, and the white component replacement unit.

As referred to herein, the RGB format refers to the RGB color space where color information is described in terms of the red, green, and blue elements that make up the color. The XYZ format refers to the XYZ color space as defined by the standards issued by the International Commission on Illumination (CIE).

Figure 1:
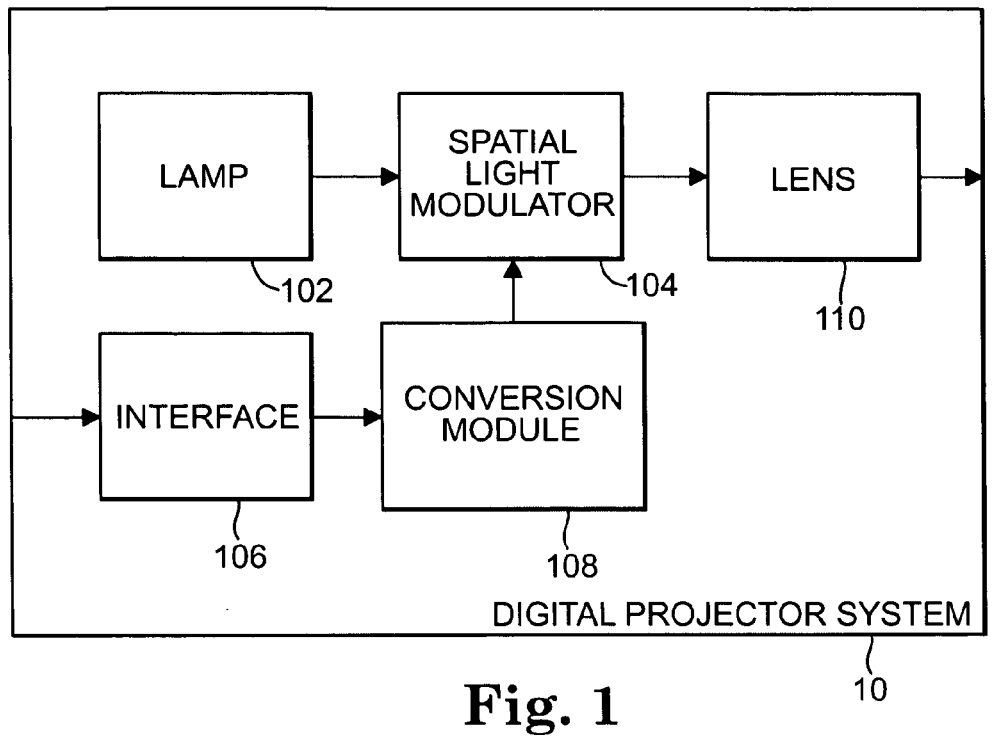
FIG. 1 is a block diagram illustrating a digital projector system according to one embodiment of the present invention.

FIG. 1 is a block diagram illustrating a digital projector system 10 according to one embodiment of the present invention. Digital projector system 10 comprises a lamp 102, a spatial light modulator 104, an interface 106, a conversion module 108, and a lens 110. In the embodiment of FIG. 1, lamp 102, spatial light modulator 104, and lens 110 may be referred to collectively as a display device.

Digital projector system 10 receives an image signal in an RGB format from an external source using interface 106 and causes images to be displayed on a screen or other surface in response to the image signal. More particularly, conversion module 108 receives the image signal from interface 106 and converts the image signal from the RGB format to an XYZ format. Conversion module 108 provides the image signal in the XYZ format to spatial light modulator 104. Lamp 102 provides a light source to spatial light modulator 104. Spatial light modulator 104 reflects selected portions of the light source through lens 110 in response to the image signal received from conversion module 108 to cause images to be projected onto the screen or other surface. Lamp 102 may be a xenon, metal halide, or another suitable projector lamp. Spatial light modulator 104 may comprise a digital micromirror device (DMD), a liquid crystal display (LCD) device, or another suitable spatial light modulator.

In other embodiments, digital projector system 10 receives the image signal in a non-RGB format and converts the image signal to an RGB format prior to providing the image signal to conversion module 108.

Figure 2:
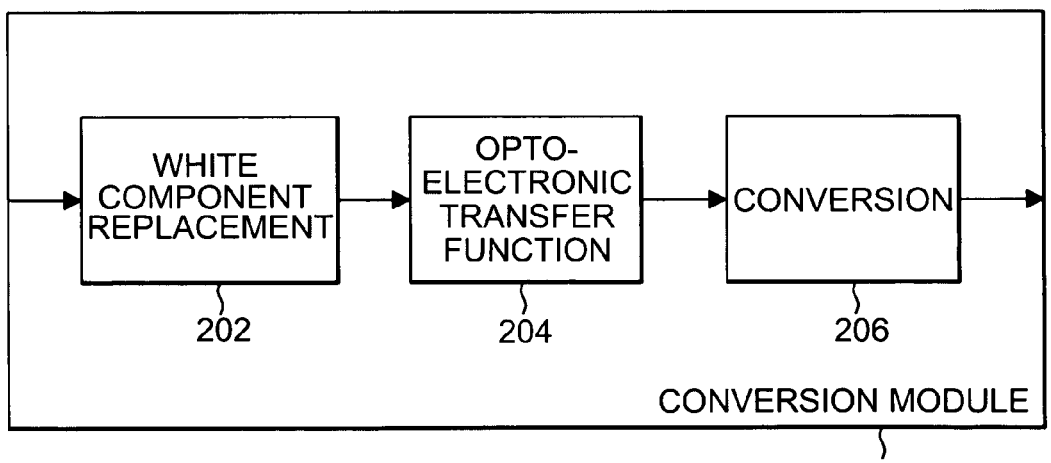
FIG. 2 is a block diagram illustrating a conversion module according to one embodiment of the present invention.
Figure 3:
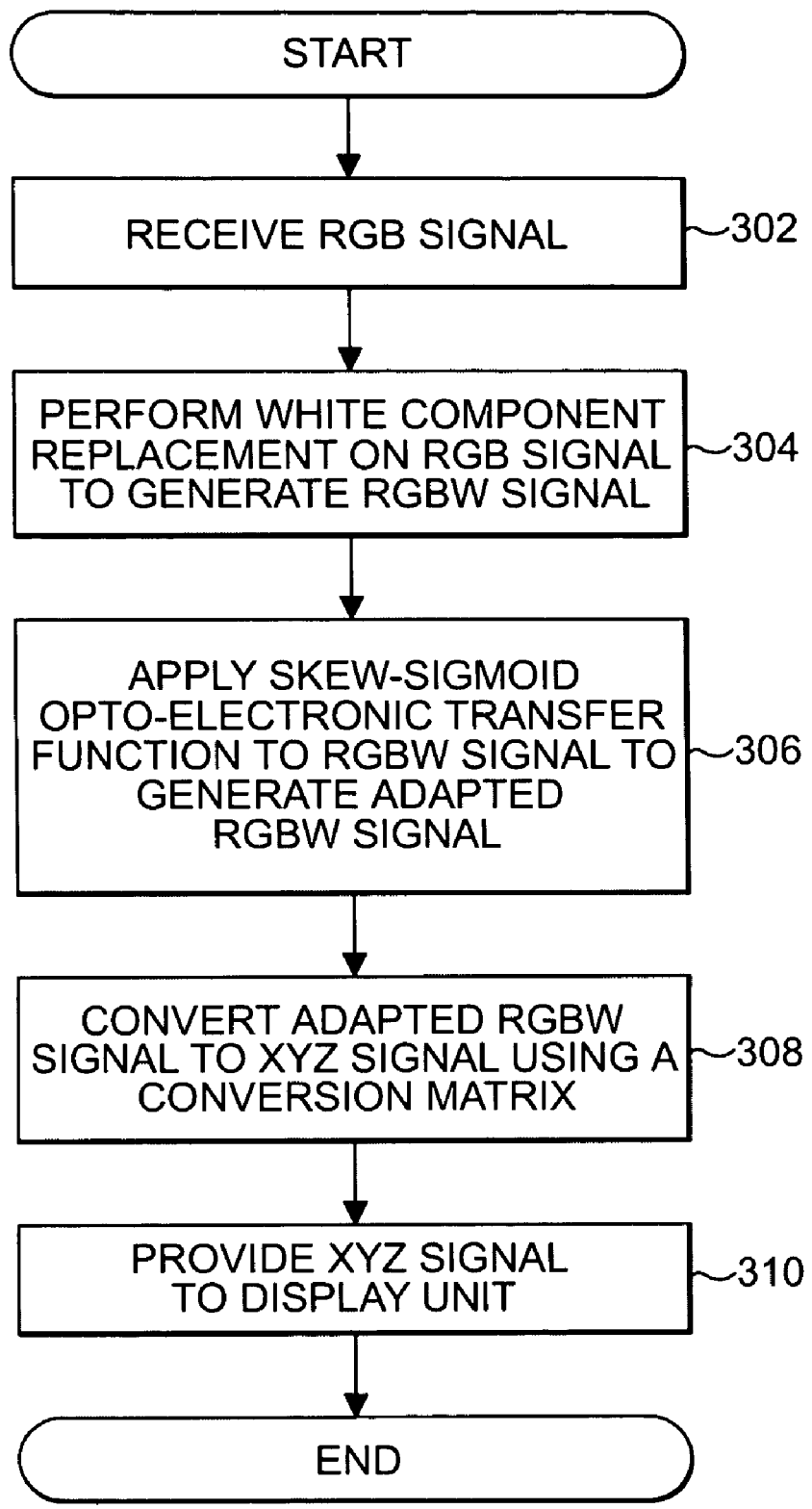
FIG. 3 is a flow diagram illustrating a method for performing image data conversion according to one embodiment of the present invention.

FIG. 2 is a block diagram illustrating additional details of conversion module 108 according to one embodiment of the present invention. In this embodiment, conversion module 108 comprises a white component replacement unit 202, an opto-electronic transfer function (OECF) unit 204, and a conversion unit 206. The operation of conversion module 108 will now be described with reference to FIG. 3. FIG. 3 is a flow diagram illustrating a method for performing image data conversion according to one embodiment of the present invention.

Conversion module 108 receives an RGB signal, i.e., an image signal in RGB format, as indicated in a block 302. In response to receiving the RGB signal, white component replacement unit 202 performs white component replacement on the RBG signal to generate an RGBW signal using a white component replacement algorithm as indicated in a block 304.

In one embodiment, white component replacement unit 202 performs white component replacement using Equations I–VI. White component replacement unit 202 calculates the amount of white corresponding to an RGB triplet, i.e., (R, G, B), using Equation I.

Equation I $$d = \max(R, G, B) - \min(R, G, B)$$

Using Equation I, white component replacement unit 202 calculates a difference value, d, by taking the maximum value of the R, G, and B values and subtracting the minimum value of the R, G, and B values where d, the difference value, represents the maximum difference for all channels. White component replacement unit 202 may normalize the R, G, and B values to the range from 0 to 1 prior to calculating d.

Subsequent to calculating the difference value, white component replacement unit 202 calculates a scale value, s, using Equation II.

Equation II $$s = \frac{d}{c_1}$$

Using Equation II, white component replacement unit 202 calculates the scale value by dividing the difference value, d, by a constant, $c_1$. The scale value determines how aggressively that the white component replacement is applied by white component replacement unit 202. In one embodiment, the constant $c_1$ may be set to a value of 32 to primarily limit the white component replacement applied by white component replacement unit 202 to the gray scale. White component replacement unit 202 may use larger values of the constant $c_1$ to apply white component replacement more broadly. The value of the scale value is clipped to be in the range from 0 to 1.

Subsequent to calculating the scale value, white component replacement unit 202 calculates the white component, W, using Equation III.

Equation III $$W = (1-s) \cdot \min(R, G, B)$$

Using Equation III, white component replacement unit 202 calculates the white component by subtracting the scale value from 1 and multiplying the result by the minimum value of the R, G, and B values. White component replacement unit 202 next calculates the red component, R, the green component, G, and the blue component, B, using Equations IV–VI, respectively.

Equation IV $$R = R - W$$

Equation V $$G = G - W$$

Equation VI $$B = B - W$$

Using Equations IV–VI, white component replacement unit 202 subtracts the white component from the red, green, and blue components, respectively. Accordingly, white component replacement unit 202 generates a set of RBGW values for each set of RGB values. In other embodiments, white component replacement unit 202 performs white component replacement in other ways.

White component replacement unit 202 provides the RGBW signal, i.e., each set of RGBW values, to OECF unit 204. OECF unit 204 receives the RGBW signal from white component replacement unit 202. In response to receiving the RGBW signal, OECF unit 204 applies a skew-sigmoid opto-electronic transfer function to the RGBW signal to generate an adapted RGBW signal as indicated in a block 306.

Figure 4:
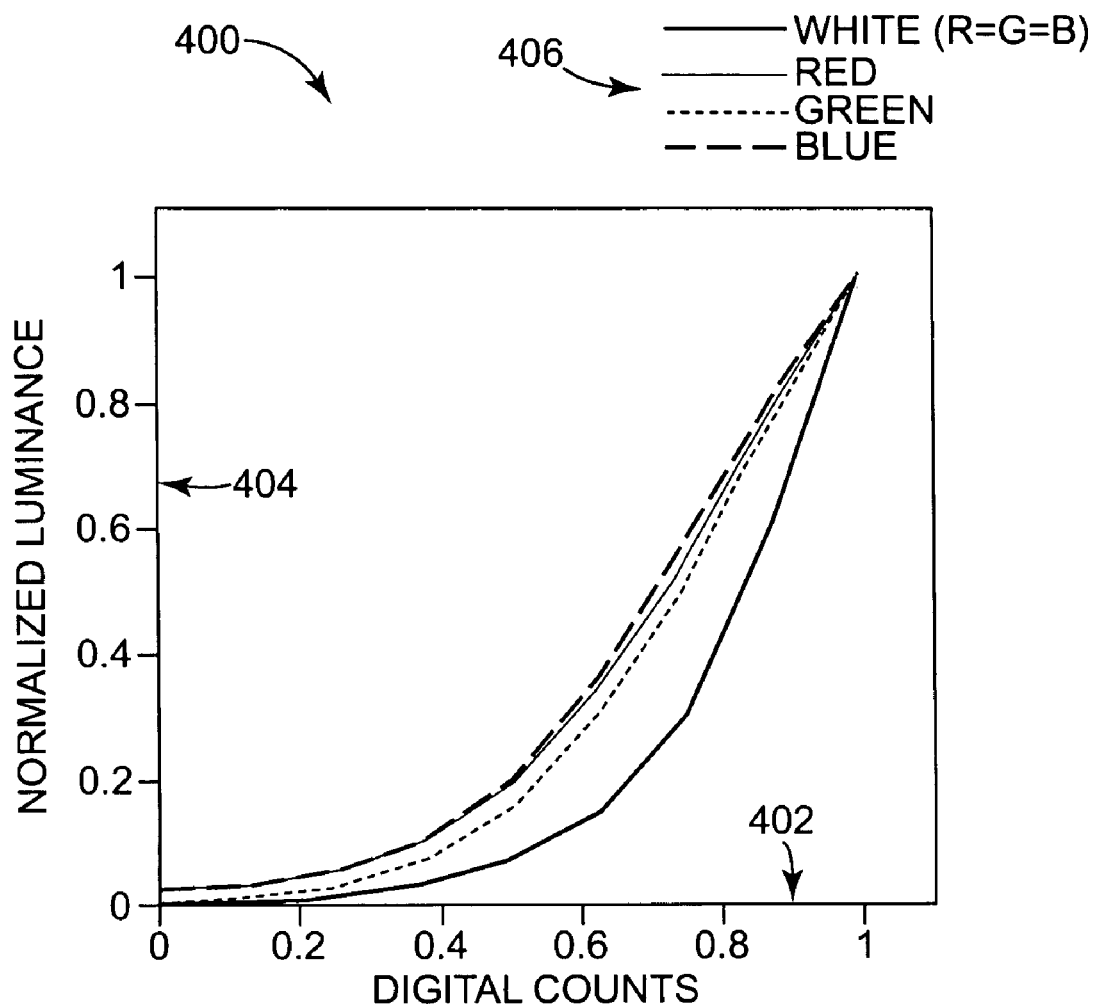
FIG. 4 is a graph illustrating digital counts versus normalized luminance according to one embodiment of the present invention.

FIG. 4 is a graph 400 illustrating digital counts along an x-axis 402 versus normalized luminance along a y-axis 404 according to one embodiment of the present invention. Graph 400 includes step ramps for the white, red, green, and blue components, respectively, as indicated in a legend 406. The step ramps are normalized to the maximum for each of the channels. In graph 400, the results for the white ramp do not closely follow those of the red, green, and blue ramps. In a typical cathode ray tube (CRT), the white ramp non-linearity may be closer to that of the red, green, and blue ramps. In addition, the RGB channels have a slight roll-off or shoulder for the higher digital counts that may be better modeled using a skew-sigmoid.

The OECF used by OECF unit 204 appears in Equation VII.

Equation VII $$y = \left( \frac{\left(\frac{-1}{1+\exp(2c_2 x - c_1)}\right) + \left(\frac{1}{1+\exp(-c_2)}\right)}{1 - \frac{2}{1+\exp(c_2)}} \right)^{c_3}$$

In Equation VII, the x value represents a red, green, blue, or white component value. The fitted values for the constant values $c_2$ and $c_3$ for each component are listed in Table 1.

TABLE 1

| COMPONENT | $c_2$ | $c_3$ |
|---|---|---|
| Red | 1.5 | 2.5 |
| Green | 1.2 | 2.7 |
| Blue | 1.6 | 2.3 |
| White | 0.3 | 3.6 |

The value for the constant value $c_1$ may be calculated for each component using Equation VIII.

Equation VIII $$c_1 = \frac{c_2}{2}$$

Using the appropriate values for $c_1$, $c_2$, and $c_3$, OECF unit 204 applies the skew-sigmoid OECF in Equation VII to each component for each set of RGBW values to calculate adapted RGBW values. The sets of adapted RGBW values calculated by OECF unit 204 using Equation VII comprise the adapted RGBW signal. OECF unit 204 provides the adapted RGBW signal to conversion unit 206.

Conversion unit 206 receives the adapted RGBW signal from OECF unit 204 and converts the adapted RGBW signal to an XYZ signal using a conversion matrix as indicated in a block 308. Conversion unit 206 applies the conversion matrix shown in Equation IX.

Equation IX $$\begin{bmatrix} X \\ Y \\ Z \end{bmatrix} = \begin{bmatrix} X_R & X_G & X_B & X_W \\ Y_R & Y_G & Y_B & Y_W \\ Z_R & Z_G & Z_B & Z_W \end{bmatrix} \begin{bmatrix} R \\ G \\ B \\ W \end{bmatrix}$$

In Equation IX, the conversion matrix comprises a four-by-three matrix with X, Y, and Z matrix values for each of the red, green, blue, and white components. The matrix values may be determined by direct measurement of the red, green, blue, and white components.

In one embodiment, conversion unit 206 uses the matrix values of Equation X.

Equation X $$\begin{bmatrix} X \\ Y \\ Z \end{bmatrix} = \begin{bmatrix} 0.394 & 0.982 & 0.426 & 4.051 \\ 0.215 & 1.768 & 0.249 & 4.647 \\ 0.012 & 0.351 & 2.253 & 5.544 \end{bmatrix} \begin{bmatrix} R \\ G \\ B \\ W \end{bmatrix}$$

These matrix values correspond to a white point of 4.051569, 4.647084, and 5.543867. This white point may be further normalized such that the luminance ranges from 0 to 1. Alternatively, this white point may be used by conversion unit 206 in converting the adapted RGBW signal to the XYZ signal. Conversion unit 206 provides the XYZ signal to a display unit as indicated in a block 310.

Figure 5:
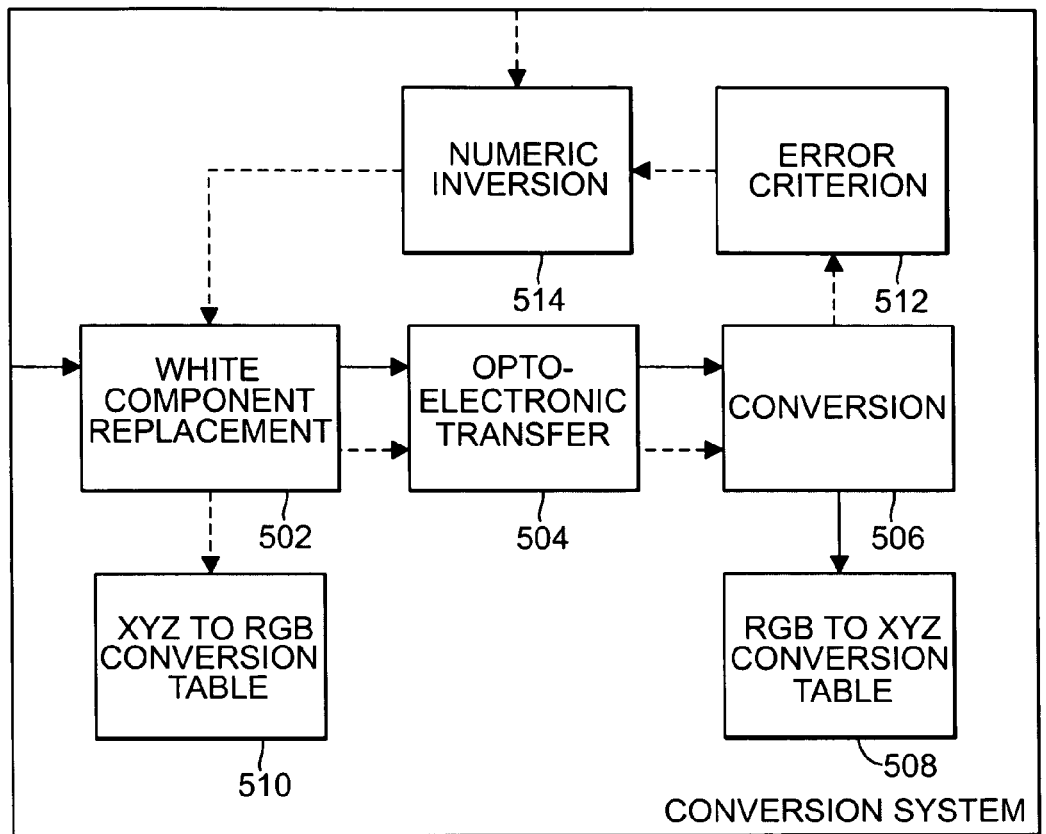
FIG. 5 is a block diagram illustrating a conversion system according to one embodiment of the present invention.

FIG. 5 is a block diagram illustrating a conversion system 500 according to one embodiment of the present invention. Conversion system 500 comprises a white component replacement unit 502, an opto-electronic transfer function (OECF) unit 504, a conversion unit 506, an RGB to XYZ conversion table 508, an error criterion unit 512, a numeric inversion unit 514, and an XYZ to RGB conversion table 510. Conversion system 500 is configured to generate RGB to XYZ conversion table 508 using white component replacement unit 502, OECF unit 504, and conversion unit 506. Conversion system 500 is configured to generate XYZ to RGB conversion table 510 using white component replacement unit 502, OECF unit 504, conversion unit 506, error criterion unit 512, and numeric inversion unit 514.

The generation of RGB to XYZ conversion table 508 is indicated by the solid arrows in FIG. 5. To generate RGB to XYZ conversion table 508, white component replacement unit 502 receives RGB values and performs white component replacement using Equations I–VI as described above to generate RGBW values. White component replacement unit 502 provides the RGBW values to OECF unit 504. OECF unit 504 receives the RGBW values and applies the skew-sigmoid opto-electronic transfer function shown in Equation VII to the RGBW values to generate adapted RGBW values. OECF unit 504 provides the adapted RGBW values to conversion unit 506. Conversion unit 506 receives the adapted RGBW values from OECF unit 504, converts the adapted RGBW values to XYZ values using the conversion matrix shown in Equation X, and stores the XYZ values along with the original RGB values in RGB to XYZ conversion table 508.

The generation of XYZ to RGB conversion table 510 is indicated by the dashed arrows in FIG. 5. To generate XYZ to RGB conversion table 510, numeric inversion unit 514 receives XYZ values, converts the XYZ values to a first iteration of RGB values, and provides the first iteration of RGB values to white component replacement unit 502. The XYZ values may come from a color gamut of a device in which XYZ to RGB conversion table 510 is to be used. White component replacement unit 502, OECF unit 504, and conversion unit 506 generate calculated XYZ values as described above using these RGB values. The calculated XYZ values are provided to error criterion unit 512 to determine whether a minimum error criterion has been met for the calculated XYZ values by comparing them to the original XYZ values received by numeric inversion unit 514.

If the minimum error criterion has not been met, then numeric inversion unit 514 calculates a next iteration of RGB values using error information received from error criterion unit 512. White component replacement unit 502, OECF unit 504, and conversion unit 506 calculate a next iteration of calculated XYZ values for the next iteration of RGB values. Error criterion unit 512 again determines whether the minimum error criterion has been met for this next iteration of calculated XYZ values. This iterative process repeats until the minimum error criterion has been met for a set of XYZ values. Once the the minimum error criterion has been met, then the original XYZ values are stored in XYZ to RGB conversion table 510 along with the last iteration of RGB values generated by numeric inversion unit 514.

To generate the each iteration of RGBW values, numeric inversion unit 514 may apply an inversion of the skew-sigmoid opto-electronic transfer function shown in Equation VII. The inversion may be generated using a Newton-Raphson inverse or other suitable numeric method.

RGB to XYZ conversion table 508 and XYZ to RGB conversion table 510 may be stored in any suitable portable or non-portable storage device (not shown) accessible to conversion system 500. Conversion system 500 provides RGB to XYZ conversion table 508 and/or XYZ to RGB conversion table 510 to an external media (not shown) using a network connection (not shown) or other suitable interface (not shown). Conversion system 500 may be implemented using any suitable hardware and/or software processing system.

Conversion tables such as RGB to XYZ conversion table 508 and XYZ to RGB conversion table 510 generated by conversion system 500 may be used in a variety of imaging devices to convert values into different formats. An imaging device includes an imaging unit configured to represent information associated with a set of received values in a medium using a set of values from one or more conversion tables. Examples of such imaging devices include display devices such as a display device 600 shown in FIG. 6 and printers such as a printer 700 shown in FIG. 7.

Figure 6:
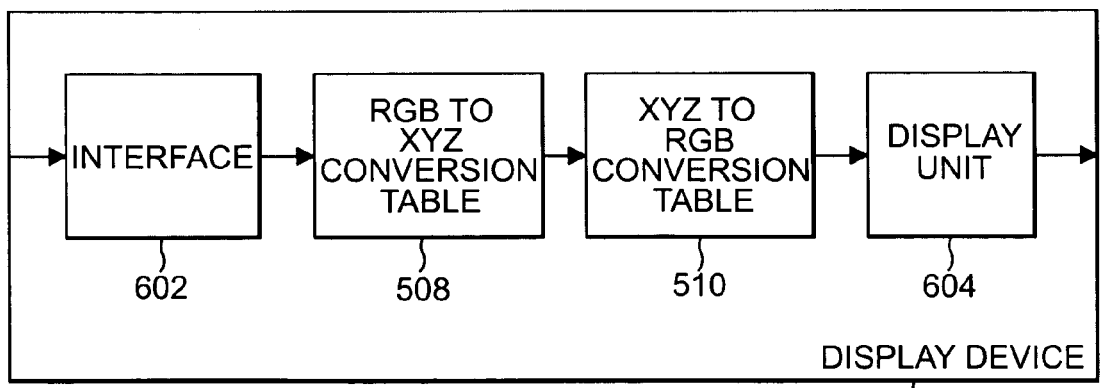
FIG. 6 is a block diagram illustrating a display device according to one embodiment of the present invention.

FIG. 6 is a block diagram illustrating display device 600, such as a digital projector, according to one embodiment of the present invention. Display device 600 comprises an interface 602, RGB to XYZ conversion table 508, XYZ to RGB conversion table 510, and a display unit 604, e.g., a spatial light modulator. Display device 600 incorporates RGB to XYZ conversion table 508 and XYZ to RGB conversion table 510, as generated by conversion system 500, to apply a colorimetric model appropriate for display unit 604 to a received RGB signal. The received RGB signal may be from a source such as a laptop computer system.

Display unit 604 may display certain colors differently from other types of display units. Accordingly, display device 600 converts a received RGB signal to an XYZ signal. Display device 600 then converts the XYZ signal to an RGB signal that is more closely suited for the color display characteristics of display unit 604.

In operation, interface 602 receives the RGB signal and causes the RGB signal to be provided to RGB to XYZ conversion table 508. In response to receiving the RGB signal, RGB to XYZ conversion table 508 provides an XYZ signal associated with the RGB signal to XYZ to RGB conversion table 510. XYZ to RGB conversion table 510 receives the XYZ signal from RGB to XYZ conversion table 508 and provides an adapted RGB signal associated with the XYZ signal to display unit 604. Display unit 604 displays information associated with the adapted RGB signal.

RGB to XYZ conversion table 508 and XYZ to RGB conversion table 510 may be stored in any suitable portable or non-portable storage device accessible to display device 600.

In another embodiment of display device 600, display unit 604 is configured to display images in response to an XYZ signal from RGB to XYZ conversion table 508. In this embodiment, XYZ to RGB conversion table 510 may be omitted.

Figure 7:
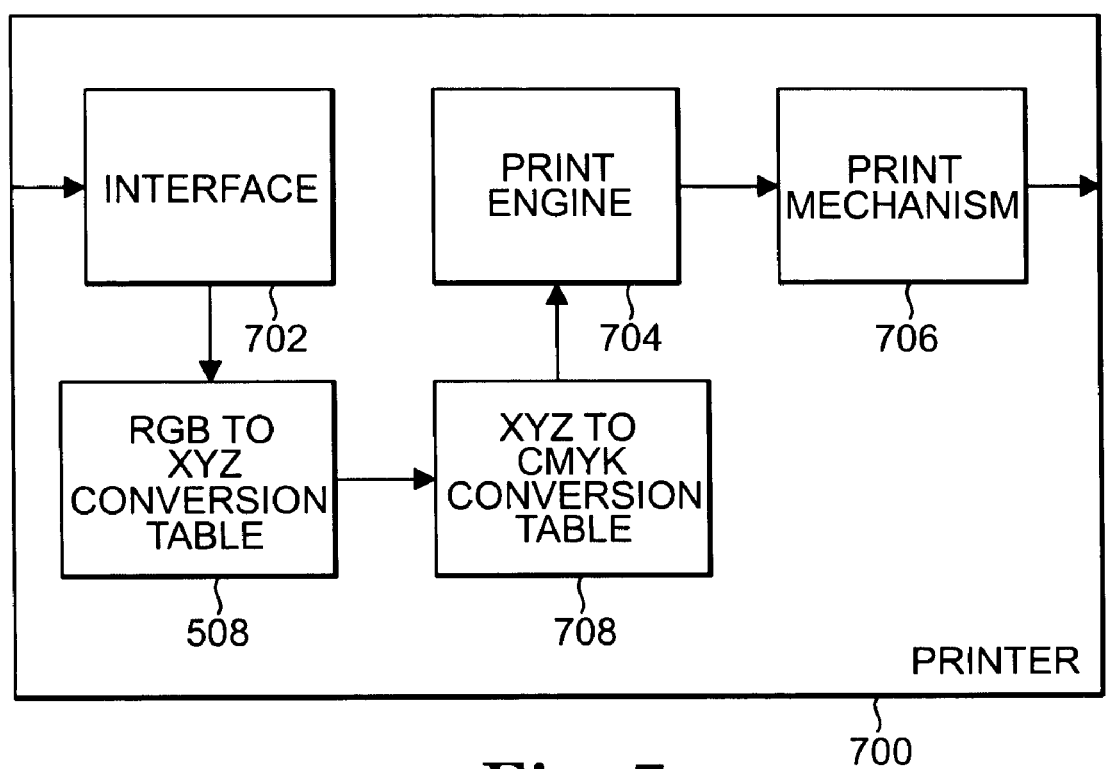
FIG. 7 is a block diagram illustrating a printer according to one embodiment of the present invention.

FIG. 7 is a block diagram illustrating a printer 700 according to one embodiment of the present invention. Printer 700 comprises an interface 702, a print engine 704, a print mechanism 706, RGB to XYZ conversion table 508, and an XYZ to CMYK conversion table 708. Printer 700 incorporates RGB to XYZ conversion table 508, as generated by conversion system 500, to apply a colorimetric model appropriate for print engine 704 to a received RGB signal. A manufacturer of printer 700 may generate XYZ to CMYK conversion table 708.

In operation, interface 702 receives the RGB signal and cause the RGB signal to be provided to RGB to XYZ conversion table 508. In response to receiving the RGB signal, RGB to XYZ conversion table 508 provides an XYZ signal associated with the RGB signal to XYZ to CMYK conversion table 708. XYZ to CMYK conversion table 708 receives the XYZ signal from RGB to XYZ conversion table 508 and provides a CMYK signal associated with the XYZ signal to print engine 704. Print engine 704 provides signals associated with the CMYK signal to print mechanism 706. In response to receiving the CMYK signal, print mechanism 706 prints information associated with the CMYK signal onto a media, e.g., paper.

RGB to XYZ conversion table 508 and X XYZ to CMYK conversion table 708 may be stored in any suitable portable or non-portable storage device accessible to display device 600.

FIGS. 6 and 7 illustrate selected applications that may incorporate one or more conversion tables such as those generated by conversion system 500. Many other applications are possible and contemplated.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method comprising:
   performing white component replacement on a first image signal received by a display device to generate a second signal;
   applying a skew-sigmoid opto-electronic transfer function to the second image signal to generate a third image signal;
   converting the third image signal to a fourth image signal using a conversion matrix;
   providing the fourth image signal to a spatial light modulator associated with the display device; and
   displaying information associated with the fourth image signal using the spatial light modulator.

2. The method of claim 1 wherein the first image signal comprises an RGB signal.

3. The method of claim 1 wherein the second image signal comprises an RGBW signal.

4. The method of claim 1 wherein the third image signal comprises an adapted RGBW signal.

5. The method of claim 1 wherein the fourth image signal comprises an XYZ signal.

6. The method of claim 1 wherein the conversion matrix comprises a four by three matrix.

7. A system comprising:
   a white component replacement unit configured to receive a first set of values and generate a second set of values in response to receiving the first set of values;
   a skew-sigmoid opto-electronic transfer function unit configured to receive the second set of values from the white component replacement unit and generate a third set of values in response to receiving the second set of values; and
   a conversion unit configured to receive the third set of values and convert the third set of values to a fourth set of values using a conversion matrix.

8. The system of claim 7 further comprising:
   a spatial light modulator configured to receive the fourth set of values and display information associated with the fourth set of values.

9. The system of claim 7 wherein the conversion unit is configured to store the first set of values and the fourth set of values in a table.

10. The system of claim 9 wherein the first set of values comprises a set of RGB values, and wherein the fourth set of values comprises a set of XYZ values.

11. The system of claim 7 wherein the first set of values comprises a set of RGB values.

12. The system of claim 7 wherein the second set of values comprises a set of RGBW values.

13. The system of claim 7 wherein the third set of values comprises a set of adapted RGBW values.

14. The system of claim 7 wherein the fourth set of values comprises a set of XYZ values.

15. A system comprising:
   means for performing white component replacement on a first signal received by the display device to generate a second signal;

means for generating a third signal from the second signal using a skew-sigmoid opto-electronic transfer function;

means for converting the third signal to a fourth signal using a conversion matrix; and means for providing the fourth signal to a spatial light modulator.

16. The system of claim 15 wherein the first signal comprises an RGB signal.

17. The system of claim 15 wherein the second signal comprises an RGBW signal.

18. The system of claim 15 wherein the third signal comprises an adapted RGBW signal.

19. The system of claim 15 wherein the fourth signal comprises an XYZ signal.

20. A system comprising:

means for generating a first set of values using an inverted skew-sigmoid opto-electronic transfer function in response to receiving a second set of values;

means for performing white component replacement on the first set of values to generate a third set of values;

means for generating a fourth set of values from the third set of values using a skew-sigmoid opto-electronic transfer function;

means for converting the fourth set of values to a fifth set of values using a conversion matrix; and means for storing the first set of values and the fifth set of values in a table in response to determining that an error criterion associated with the fifth set of values has been met.

21. The system of claim 20 wherein the first set of values comprises a set of RGB values.

22. The system of claim 20 wherein the second set of values comprises a set of XYZ values.

23. The system of claim 20 wherein the third set of values comprises a set of RGBW values.

24. The system of claim 20 wherein the fourth set of values comprises a set of adapted RGBW values.

25. The system of claim 20 wherein the fifth set of values comprises a set of XYZ values.

26. An imaging device comprising:

a first conversion table comprising a first set of values and a second set of values, wherein the second set of values is generated from the first set of values using a white component replacement algorithm, a skew-sigmoid opto-electronic transfer function, and a conversion matrix;

an interface configured to receive a signal that comprises the first set of values and configured to cause the first set of values to be provided to the first conversion table; and an imaging unit configured to represent information associated with the second set of values in a medium in response to the interface receiving the signal.

27. The imaging device of claim 26 wherein the first set of values comprises a set of RGB values, and wherein the second set of values comprises a set of XYZ values.

28. The imaging device of claim 26 further comprising:

a second conversion table comprising the second set of values and a third set of values corresponding to the second set of values; and wherein the imaging unit is configured to display the information responsive to the third set of values.

29. The imaging device of claim 28 wherein the first set of values comprises a first set of RGB values, wherein the second set of values comprises a set of XYZ values, and wherein the third set of values comprises a second set of RGB values.

30. The imaging device of claim 26 wherein the imaging unit comprises a display unit.

31. The imaging device of claim 26 further comprising:

a second conversion table comprising the second set of values and a third set of values corresponding to the second set of values;

wherein the imaging unit comprises a printer configured to access the third set of values from the second conversion table in response to the signal being received by the interface, and wherein the printer is configured to print the information associated with the first set of values using the third set of values.

32. The imaging device of claim 31 wherein the first set of values comprises a set of RGB values, wherein the second set of values comprises a set of XYZ values, and wherein the third set of values comprises a set of CMYK values.

* * * * *